United States Patent Office 3,458,329
Patented July 29, 1969

3,458,329
CERAMIC GREENSHEETS
Kenneth E. Owens, East Oakdale Township, Washington County, and Robert A. Hatch, White Bear Lake, Minn., assignors to Minnesota Mining & Manufacturing Company, St. Paul, Minn., a corporation of Delaware
Filed Feb. 13, 1963, Ser. No. 258,298
Int. Cl. C04b 31/32, 35/00
U.S. Cl. 106—39
19 Claims This invention relates to ceramic greensheets having papyraceous properties and processes and pulps for the production thereof.

Heretofore the art has produced more or less paper-like sheets and boards of various types comprising asbestos fibers and other reinforcing fibers such as glass fibers by using large proportions, i.e. 30 to 100 percent of these inorganic fibers.

Asbestos paper is fairly typical of such products. It does not burn because substantially free from organic matter and is therefore of use for many purposes but its usefulness is limited by the fact that asbestos is actually altered to become friable at temperatures of about 600° C. So far as is known no method is available for overcoming this character of such prior art paper-like sheets. Even when relatively refractory alumino-silicate glass fibers are employed to make sheets, the inherent devitrification results in limited usefulness at temperatures of 1200° C. and upwards. These temperatures are below the temperatures which are encountered in many operations, processes and devices.

Essentially the processes employed in the making of such sheets have involved the paper makers technology using relatively small amounts, if any, of finely divided material and relatively large amounts of fiber, i.e. 30 to 100 percent as noted, making a suspension in water and collecting the suspension on a screen as in a Fourdrinier machine. Sheets made by this procedure are relatively non-pliable, that is they show poor crease-resistance, for example, they are not readily corrugated after drying. Furthermore, unless large amounts of the fibers are used in making the sheets, there are extensive white water losses.

It has heretofore been proposed to make paper-like sheets which are fired to ceramic dielectrics using very small amounts of cellulosic fibers as binders. These have includes as little as one-half percent of fibers. Suspensions of this prior art type are subject to high white water losses when fabricated into paper by casting on a screen as in a Fourdrinier machine. The paper thus produced is relatively weak and fragile and cannot readily be formed, shaped or manipulated.

Because certain ceramics are resistant to relatively high temperatures, i.e. above 1200° C., it would be very desirable to be able to produce sheets of such materials and because the paper making technology aforenoted provides an efficient method of forming sheets it would be very desirable to produce sheets by such techniques. It is, however, obviously impossible to produce fired ceramic sheets directly by paper making technology but we have found for the first time so far as we are aware a method of forming precursors to fired ceramics using paper making technology. The term here adopted to describe sheet materials convertible on suitable firing to a ceramic body is "ceramic greensheet." Such greensheets may be paper-like and very thin, or they may be thicker and more like cardboard or even thicker and be like a pressed board. This invention is concerned particularly with papyraceous ceramic greensheets and the method by which they are produced.

It is an object of the invention to provide pulps for the production of ceramic greensheets.

Another object of the invention is to provide ceramic greensheets having corrugated structure fireable to corrugated ceramic structures. Another object is to provide pulps adapted to production of ceramic greensheets by employing papermaking technology. Yet another object of the invention is to provide ceramic greensheets having the kind of pliability needed for folding and corrugatability. A further object of the invention is to produce ceramic greensheets which fire to rigid ceramic structures with substantially no slumping. A still further object of the invention is to provide ceramic greensheets fireable to refractory ceramics with substantially no change in dimensions.

An additional object of the invention is to provide ceramic greensheets amenable to operations for controlling the porosity and thermal shock resistance of fired ceramics produced therefrom. Yet other objects of the invention will become evident hereinafter.

In accordance with these and other objects of the invention it has been found that when particular combinations of ceramic raw materials and fibrous materials are treated as hereinafter described in detail, ceramic greensheets are produced which are fireable to ceramic materials of outstanding properties. Neither the ceramic greensheets of this invention nor the highly advantageous slurries and flocculated pulps of the present invention nor the processes for making them so that refractory structures having particular ceramic compositions are obtained by the firing thereof have been disclosed or suggested anywhere so far as we are aware.

The characteristic of the fired ceramics of the invention to which it is believed that the properties are largely ascribable is that the particles are bonded together by recrystallization or by phase changes resulting from chemical interaction on firing of the different components rather than by being merely adhered or stuck together by fusion of low melting components. The compositions thus contain only very small and substantially insignificant amounts of such low melting components, e.g. low melting sodium and/or potassium glasses, and when fired consist essentially of refractory minerial species and refractory vitreous phases.

The compositions of the invention are shown graphically by means of diagrams in the accompanying figures wherein.

Referring again to FIGURE 1, it will be seen that the apices of the tetrahedron, there designated $e$, $p$, $j$ and $q$, form the forward apex of a larger equilateral tetrahedron which would include compositions outside the scope of the present invention. The rear plane of FIGURE 1, $ejq$, is at 70 weight percent of non-fibrous mineral materials. The coordinates in percents by weight of the points designated by lower case letters of FIGURE 1 are provided in tabular form as to the four components.

| Point | Non-fibrous mineral materials | Inorganic fibers | Organic fibers | Elastomer latex |
|---|---|---|---|---|
| a | 70 | 20 | | 10 |
| a' | 70 | 29 | | 1 |
| b | 82 | 8 | | 10 |
| b' | 91 | 8 | | 1 |
| c | 82 | | 8 | 10 |
| c' | 91 | | 8 | 1 |
| d | 81 | 15 | | 4 |
| d' | 83 | 15 | | 2 |
| e | 70 | 30 | | |
| f | 92 | 8 | | |
| g | 88 | 8 | | 4 |
| g' | 90 | 8 | | 2 |
| h | 70 | | 20 | 10 |
| h' | 70 | | 29 | 1 |
| j | 70 | | 30 | |
| k | 81 | | 15 | 4 |
| k' | 83 | | 15 | 2 |
| m | 88 | | 8 | 4 |
| m' | 90 | | 8 | 2 |
| n | 92 | | 8 | |
| p | 100 | | | |
| q | 70 | | | 30 |

It will be seen that there are three volumes and a plane included within the scope of the invention. Compositions broadly include the ingredients falling within the volume: *habcnjef*. Useful compositions not containing elastomer latex fall on the plane: *njef*. Particularly useful compositions containing elastomer latex fall within the volume: *habcc'h'a'b'*. The preferred compositions for flexibility and corrugatability fall within the volume: *dgmkk'd'g'm*. For greater clarity in presentation portions of the coordinate system of FIGURE 1 which do not pertain to compositions of the invention but serve to orient the figure are shown as phantom lines, viz. lines *qa, qh, qp, pf* and *pn*. Those portions of the figure which would not then be visible, lines *a'h', ej, dk* and *d'k'* are shown to be concealed by broken lines.

Figures 1, 2, 3:
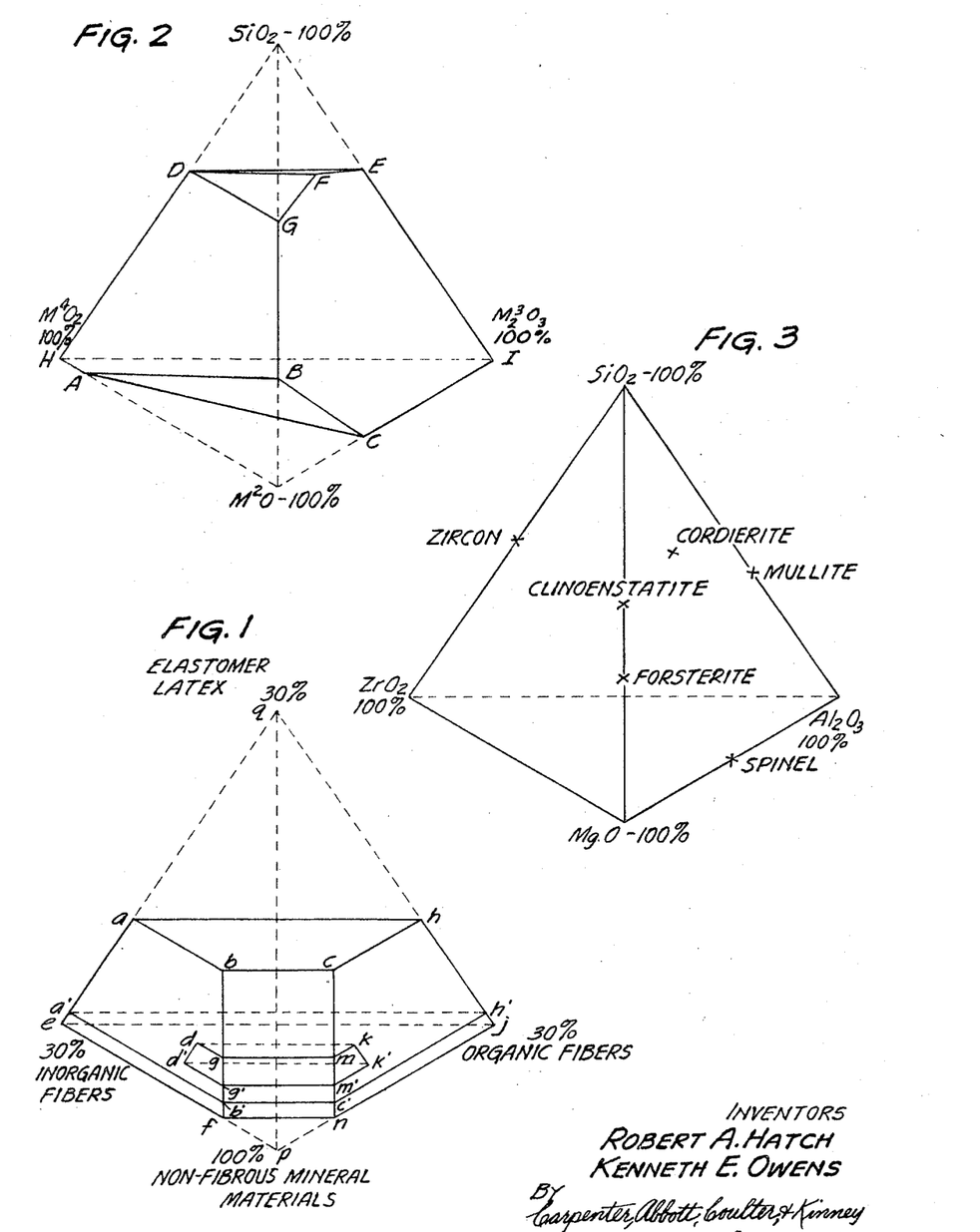
FIGURE 1 shows the compositions in weight percent of pulps, slurries and greensheets of the invention as to the four solid components: non-fibrous mineral materials, fibrous mineral materials, organic fibers and elastomer latex plotted on the apex of a four component graph.
FIGURE 2 shows the inorganic constituents in mole percent plotted on a four component graph of the compositions of pulps, slurries and greensheets of the invention as to the four oxide constituents $SiO_2$, $M^4O_2$, $M_2^3O_3$ and $M^2O$, wherein M designates a cationic metal and the superscript numbers refer to valences.
FIGURE 3 shows the crystalline inorganic compounds obtained at equilibrium by the firing of preferred compositions of the invention consisting essentially of $SiO_2$, $ZrO_2$, $Al_2O_3$ and MgO as the compositions appear on a four component graph in mole percent.

Referring now to FIGURE 2, the coordinates, as mole percentages of each of the four components in the compositions designated by capital letters are shown in the following tabulation.

| | $SiO_2$ | $M^4O_2$ | $M^2O$ | $M_2^3O_3$ |
|---|---|---|---|---|
| Composition: | | | | |
| A | | | 90 | 10 |
| B | | 25 | 75 | |
| C | | | 60 | 40 |
| D | 60 | 40 | | |
| E | 50 | | | 50 |
| F | 64 | | 18 | 18 |
| G | 60 | | 40 | |
| H | | 100 | | |
| I | | | | 100 |

It will be understood that the designation of the volume ABCDEFG includes also the two apices $M^4O_2$ and $M_2^3O_3$ and may, therefore, also be designated as the volume ABCDEFGHI. As in FIGURE 1 the lines of the coordinate system extraneous to the invention are shown as phantoms.

Referring to FIGURE 3, the relatively important refractory mineral species are shown as placed on a coordinate system drawn to the same scale as FIGURE 2. It will be noted that zircon and zirconia ($ZrO_2$) are the only species which do not fall on the one face of the tetrahedron. It will also be seen that the volume designated in FIGURE 2 permits the presence of up to 10 mole percent more of the excluded oxides MgO and $SiO_2$ than required for the compositions of the mineral species specifically shown in FIGURE 3.

Broadly the process of the invention comprises three steps:

(1) Formation of an aqueous slurry of suitable composition
(2) Conversion of the slurry to a pulp
(3) Molding of the pulp.

Ancillary operations e.g. densification of the molded pulp, corrugation or other shaping of greensheets may be employed for particular purposes and useful products are obtained by variations in the above procedure within the scope of the following description.

I. RAW MATERIALS

Referring particularly to be compositions as shown by FIGURE 1, the four solid components, viz. non-fibrous mineral materials, fibrous mineral materials, organic fibers and elastomer latex are employed in amounts included within the portion of the diagram designated *habcnjef* in the form of a slurry. The slurry is prepared to contain from about 2 to 20 percent by weight of solids (the balance being the vehicle such as water) the solids consisting essentially of from about 70 to about 92 percent by weight of finely divided (smaller than 110 mesh) non-fibrous mineral materials, 30 to 8 percent by weight respectively of fibrous materials and up to about 10 percent by weight of elastomer added in latex form, at least one of the solids being hydrated or gelatinized in aqueous suspension.

The fibrous materials are characterized by having their diameter in the range of about 0.2 to about 10 microns and lengths at least ten times and up to about 100 or more times as great. Desirably at least 5 percent by weight of the total solids consists of organic fibrous materials and is advantageously celluosic, e.g., wood pulp, rag pulp, cotton linters etc. and particularly a highly beaten cellulose i.e. gelatinized or hydrated. A convenient source of such latter materials is scrap map overlay tracing paper, glassine paper or semi-transparent paper. Because small particle size is found desirable the reprocessing of such scrap is not a disadvantage. Virgin fibers such as a bleached or semibleached kraft paper pulp can also be employed and some hydration will occur even when an unbeaten cellulose is employed and such longer fibers will provide somewhat more mechanical reinforcement to the greensheet and are desirable under some conditions as will be apparent from the present disclosure. Cellulose fibers which have not been ground or macerated are generally unsatisfactory when used alone to give a useful pulp or to confer adequate reinforcing effect on the greensheet formed from the pulp. Examples of such generally undesirable materials are crude wood pulp, straw, Spanish moss, unprocessed cotton and the like coarse materials.

Mineral fibers which may be employed include silica fibers, alumino-silicate fibers, glass fibers particularly of very fine sizes less than about 3 or 4 microns in diameter, leached glass fibers and other such fibers which fall within permissible ranges of compositions for the total of solids employed. The small percentage of alkali metal oxides in glass fibers are tolerated because they are generally without effect on the composition as a whole; but such will be avoided where complete freedom from fluxing metals, e.g. sodium, is necessary. Fine, fused quartz fibers may be employed to provide part of the silica in the final composition or very fine asbestos fibers may provide several of the elements including small amounts of extraneous elements. In no case, however, are the fibers retained as a mineral species after firing has been completely effected although sometimes microscopically observable in somewhat underfired ceramics.

In general, no significant hydration or gelating action of mineral fibers is to be expected and accordingly they do not appear to serve the same functions as the organic fibers or certain day minerals. They serve more in reinforcement of the flocs thereby promoting drainage rate and decreasing white water losses of the mineral ingredients, whereas the organic fibers serve as tensile strengtheners of greensheets both before and after drying and further help in agglomeration of the various constituents in the slurries and pulps of the invention. Certain mineral materials may assist in similar functions. Alumino-silicate, silica and refractory crystalline fibers appear to decrease shrinkage during firing of greensheets of the invention.

The non-fibrous mineral materials as stated above are employed in finely divided form, at least smaller than

110 mesh. Preferably 80 percent or more of the particles will pass a 325 mesh screen. The small size of these particles is important in compositions of the invention because only such very fine particles are satisfactorily well dispersed and maintained in homogeneous admixture with the fibrous materials, which at least in the case of the organic fibers differ quite considerably in density, and further because only the very fine particles appear to be sufficiently reactive to form ceramic minerals when greensheets and shapes formed therefrom are subsequently fired. It is particularly preferred that the particles be of different and non-uniform sizes since this permits denser packing thereof.

The non-fibrous and fibrous mineral materials together are selected to provide the ultimate mineral species of the fired ceramics and must accordingly be chosen for that purposes as well as to provide the relative amounts of fibrous and non-fibrous materials to give the desired mechanical properties, i.e. floc character, porosity, etc, to the greensheets.

Referring now to FIGURE 2 it will be seen that the essential four oxide constituents are $SiO_2$, $M^4O_2$, $M_2^3O_3$ and $M^2O$ wherein the superscript numbers refer to valences of the cationic metals designated by M. The cationic metals are characterized as having ionic radii of from about 0.6 to about 0.9 Angstrom unit or, expressed as a ratio to the radius of the oxide ion ($O^=$), a radius ratio of about 0.41 to about 0.73. This ratio permits spacing at the points of an octahedron with an oxide ion at the center so that the cationic metals have coordination numbers of 6 as described, for example, by Mason, Principles of Geochemistry, John Wiley and Sons, Inc., New York, 1952. Cationic metals having ionic radii in the specified range and valences no greater than 4 include Al, Ti, Cr, Fe (ic and ous), Li, Mg, Mn(ous), Zr, Hf, Co, and Ni. It will be seen that with the exception of lithium all are polyvalent.

It will be recognized that zirconium and readily hafnium are equivalents and that zirconium compounds regularly contain greater or less amounts of the equivalent hafnium compounds. It is found that for purposes of this invention the mineralogically recognized equivalence of other cationic metals is controlling as to the materials employed. Thus, for purposes of this invention lithium is to be considered in the mineralogical sense as being equivalent to magnesium, that is that lithium oxide is of the type of $M^2O$. Such replacement in crystal structures e.g. Li for Mg, Zn for Al, etc., is said to be admission of the lower valent element into the lattice and must be accompanied and electrically balanced by substitution of other elements having higher charges than the one replaced (referred to as capture) such as replacement of calcium by yttrium, boron by silicon, lithium by nickel, sodium by calcium, and the like. An element which replaces another of like charge and similar ionic radius is said to be camouflaged, e.g. chromium replacing aluminum, nickel replacing magnesium, etc. This ability of elements to be substituted one for the other is termed diadochy and the elements are said to be diadochic. Two elements are sometimes diadochic in one mineral species and not in others. Aluminum sometimes diadochically replaces silicon since it may possess either 4-fold or 6-fold coordination and silicon regularly possess 4-fold coordination.

In general, diadochic replacement occurs to a relatively minor extent, e.g. less than 50 percent of a given element, and often only up to about 10 mol percent. Such replacement is substantially without effect on the crystal lattice although optical and physical properties may be altered, e.g. index of refraction and melting point. However, replacement without charge alteration may be complete in some instances with retention of substantially the crystallographic species, for example replacement of both magnesium and aluminum in a spinel to give a ferrite. Replacement with change of charge when over about 50 percent may result in a substantially different mineral species, for example, lithium replacing magnesium and silicon replacing aluminum in cordierite to give beta-spodumene with progressively greater silica contents, e.g. higher silica beta-spodumenes which are sometimes commonly referred to as "petalite." These relationships are more evident from the following chemical compositions in which comparability is achieved by reduction to a common number of oxygen atoms:

cordierite beta-spodumene

"pentalite"

It will readily be understood by those skilled in the art that the phases obtained from a given composition are read from the phase diagram. For purposes of this invention, these phases are considered the equivalents of the compositions in which diadochic replacement has occurred as described herein elsewhere. Thus, the term spinel comprehends also ferrites, cordierite comprehends beta-spodumene and the like. However, while broadly equivalent in the elaboration as herein described of compositions, slurries, pulps and processes of the invention, the end uses after firing of structures comprising certain of these phases may vary as a result of the properties peculiar to certain mineral species. Thus, structures comprising predominantly, for example, alumina, zirconia, zircon, mullite, cordierite, forsterite, clinoenstatite or beta-spodumene or substantially equilibrated mixtures of any thereof as shown in the phase diagram are preeminently valuable as refractories. The diadochic equivalents of spinel, i.e., ferrites, are particularly valuable for their ferromagnetic properties.

It is found that compositions which provide more than a few mole percent of solid phases of either magnesium oxide or silicon dioxide (in any of the crystallographic forms) are less satisfactory for purposes of the invention and it will be seen that such compositions are generally outside the preferred mineral species ranges shown in FIGURE 3. It is believed within the skill of the art to avoid firing conditions for compositions of the invention which may result in liberation of these undesirable phases, for example, firing zircon-containing greensheets above the dissociation temperature of zircon. The choice of compositions within the preferred range having the desired refractory properties after firing will be apparent from the present disclosure. This invention is concerned more particularly with the formation of greensheets and the intermediate slurries and pulps therefor.

Small amounts of mineralizers, up to about 3 to 4% may be included in the compositions of the invention as finely divided non-fibrous mineral materials, preferably as oxides of elements standing in diadochic relation to one of the elements aluminum, zirconium or magnesium, but salts may also be employed such as zinc borate, and fluorides. Illustrative of the incorporation of such materials are the use of calcium, magnesium, manganous or titanium oxides with alumina; lithium, magnesium, zinc of ferric oxides with mullite; lithia with spinel; lithium fluoride with enstatite; beryllia with cordierite and calcium or magnesium oxide with zircon or zirconia.

The choice of raw materials for formation of compositions of the invention is particularly illustrated in the examples but the choice is not intended to be limited thereby. In general, when zircon is desired it is conveniently provided as that natural mineral in finely divided form. Zirconia may constitute a phase in certain compositions of the invention and it is then employed in a finely divided ceramic grade which may include small amounts of known stabilizers against crystallographic inversion which occurs with concomitant volume change. In some ceramic material produced by firing greensheets of the invention, zircon will be present as a phase in a continuous matrix of, for example, mullite or cordierite.

Alumina may constitute the sole mineral species in the fired ceramic in which case purified bauxite or other hydrated alumina is desirably employed in amounts of about 15 to 35% by weight as an auxiliary agglomerator together with greater or lesser amounts of aluminum oxide. Because of the hardness of corundum and hence difficulty of comminution to the necessary degree it is often convenient to employ a manufactured aluminum oxide of proper particle size and it is particularly convenient to use an at least partially hydrated aluminum oxide.

Alumina is present in combined form with silica in mullite, cordierite and beta-spodumene and minerals including these two oxides or equivalents thereof, and essentially devoid of glass forming alkali metal oxides but which may include magnesium oxide and the equivalents thereof, are used including:

Kaolinite — $Al_2Si_2O_5(OH)_4$
Endellite — $Al_2Si_2O_5(OH)_3$
Bentonite,
   montmorillonite — $Na_{0.33}(Al_{1.67}Mg_{0.33})Si_4O_{10}(OH)_2$
Hectorite — $Na_{0.33}(Mg_{2.67}Li_{0.33})Si_4O_{10}(OH)_2$
Saponite — $Na_{0.33}Mg_{3.00}(Al_{0.33}Si_{3.67})O_{10}(OH)_2$
Chlorite — $H_8Mg_5Al_2Si_3O_{18}$
Talc — $H_2Mg_3Si_4O_{12}$
Sepiolite — $H_4Mg_2Si_3O_{10}$
Pyrophyllite — $Al_2(Si_4O_{10})(OH)_2$
Serpentine — $H_4Mg_3Si_2O_9$
Andalusite — $Al_2O_3.SiO_2$
Sillimanite — $Al_2O_3.SiO_2$
Kyanite — $Al_2O_3.SiO_2$
Mullite — $3Al_2O_3.2SiO_2$
Cordierite — $2MgO.2Al_2O_3.5SiO_2$
Petalite — $Li_2O.Al_2O_3.8SiO_2$
Spodumene — $Li_2O.Al_2O_3.4SiO_2$
Eucryptite — $Li_2O.Al_2O_3.2SiO_2$
Topaz — $Al_2(OH,F)_2SiO_4$ Minerals containing minor amounts of volatile components, e.g., water alone or with fluorine, chlorine, hydroxyl, carbonate, etc which otherwise contain the desired oxides are to be considered equivalents for purposes of the invention. As noted below the montmorillonitic clays are exchanged with polyvalent cations before incorporation in compositions of the invention.

It will be recognized that when formulae are given for naturally occurring minerals as above the atomic proportions are somewhat idealized and variations can and do occur particularly when dealing with relatively large masses which may include greater or less amounts of unrecognized or unsuspected impurities or gangue. Those skilled in the art will appreciate how the effect of these impurities is overcome by adjustment of formulations to reach the desired composition or at least bring the impurities into unobjectionable combinations in the composition. Alternatively several formulations are made to give a desired composition with slight variation on each side thereof and the one which on firing nearest approximates the expected properties is then selected for larger scale operation. Some variation may occur if there is preferential loss of one mineral material in the white water losses with greater retention of some other mineral material. This effect is much reduced by the low white water losses attained employing the processes and compositions of this invention.

Alternative compositions can be formulated using different mineral materials as exemplified by the following in which the molar amounts of the reactants are indicated.

I. Compositions to provide mullite 2 quartz (or other silica)+0 to 3 moles alumina+3 to 0 hydrated aluminum oxide 1 kaolinite+0 to 2 alumina+2 to 0 hydrated aluminum oxide
2 kyanite+0 to 1 alumina+1 to 0 hydrated aluminum oxide II. Compositions to provide cordierite (a) Slight silica excess
  2 kaolin+⅔ talc
  2 kaolin+¾ hectorite
(b) Slight silica deficiency
  3 kyanite+1 talc
(c) Normal composition with more or less impurities
  2 kyanite+¾ hectorite
  ⅝ bentonite+⅝ talc+alumina
  5/4 bentonite+2 magnesium hydroxide+¾ alumina
  5/4 bentonite+2 magnesia+¾ alumina
  ½ bentonite+2 magnesia+⅜ kaolin
  1 bentonite+1 hectorite+4 aluminum metal
  1 bentonite+⅔ asbestos+2 aluminum metal (The bentonite in the last six compositions above is exchanged with aluminum sulfate to replace sodium and they thus provide a part of the aluminum needed in the compositions).

Certain of the clay minerals, e.g. bentonite, hectorite, etc., which contain exchangeable sodium, are desirably treated with a solution of a cation, e.g. aluminum, or other polyvalent element which removes the alkali metal and at the same time provides a mineral material which is more sensitive to subsequent flocculation, e.g. with polyethyleneimine which does not flocculate the sodium form of bentonite. For some purposes such exchanged clays may floc sufficiently to make the slurries directly useful, e.g. for slip-casting. More usually the flocculated clay i.e. after cation-exchange, is dispersed mechanically in water and used in that condition. Such cation-exchanged clays are to be recognized as distinct starting materials different from the clays which might be used in ordinary pottery and in which the sodium is not only unobjectionable but may even be desirable because of its effect on the working properties of the clay. Because of the high ionic radii and coordination numbers of the alkali metals Na, K, Rb and Cs and the alkaline earth elements, Ca, Sr, Ba and because of their glass-forming properties with silica they are desirably avoided in silicious compositions. Small incidental amounts of the order of 2–3 mole percent can be tolerated in many cases but it is desirable that the silicious compositions of the invention be free from these elements. When present they may result in formation of substantially devitrifiable glasses having poor refractory power and possibly subject to volume changes on devitrification which might sunder fired ceramic articles.

Polyvalent-cation-exchanged montmorillonite clays, e.g. hectorite, saponite, bentonite, etc. and particularly these as aluminum-exchanged clays are useful mineral materials when their compositions are applicable because of their tendency to be hydrated or gelatinized and to act as agglomerators. They thus appear to serve to draw other components together and to sensitize the combination as a whole to the pulp-forming flocculation step. It will be recognized that, at least as applied to clays, hydration or gelatinization is to some extent the equivalent of peptization but is retained to a useful extent even when they are flocculated.

One other material which is employed in certain embodiments of the invention is rubber latex, which appears also to be an agglomerator and tends to behave much as the cation-exchanged clays. So far as is known the particular rubber is not critical, that is it may be natural or any of the available or known synthetic rubber latices. Since the rubber is destroyed on firing the amount used is immaterial as regards the ultimate mineral species. They are thus particularly useful when changes in composition might be brought about by use of cation-exchanged clays. Rubber in latex form also appears to serve as a molding adjuvant and binder for the mineral materials, that is its addition appears to assist in ease of molding the pulps of the invention to greensheets or other fireable shapes particularly when densification is employed. Amounts used are from about 1 to 6 percent by weight of total solids of a latex containing about 40 percent solid diluted to about 1–10 percent solids with water. In certain embodiments none is added but to obtain the desirable effects the minimum amount appears to be about 1 percent. Amounts in excess of about 10 percent increase the porosity or voids of the fired shape.

II. MAKING OF SLURRY

The first step in the process of the invention is the formation of a slurry of the particular raw materials selected. This slurry is normally characterized by some differential settling because of differences (which may be quite large) in specific gravity of the various components which in spite of the presence of agglomerators as noted above are not inextricably commingled. The extent to which this separation can occur is decreased by employing hydrated or gelatinized components such as hydrated mineral materials and highly beaten pulp and also by the above-noted agglomerators. Coarser particles of mineral materials particularly tend to settle out relatively rapidly under stagnant storage while the finer particles remain suspended for longer times as is to be expected. It is found that the most advantageous procedure is to suspend the fibrous materials in sufficient water to give a final concentration of 0.5 to 5 percent of solids and where necessary to beat for a sufficient time to break up clumps and aggregates of fiber. The mineral materials are then added and mixed thoroughly followed by the latex when the latter is employed. The final concentration of all solids in the slurry should be within the range of 2 to 20 percent. It is preferred that the concentration be in the range of 4 to 10 percent of solids. The hydrated or gelatinized materials and latex together tend to cooperate in the suspension or peptization of the other materials so that a rather slower settling time and greater homogeneity of the slurry are achieved.

The pH of the slurry is adjusted to between about 4 and 6.5 by means of hydrated aluminum sulfate to further minimize settling, and the slurry is ready for the next step. There may be some partial flocculation or sensitization brought about by this adjustment of the pH. The slurry may be used directly or stored in a tank or chest for mixing with other batches and used subsequently, for example, in a Fourdrinier machine.

III. FLOCCULATION (MAKING OF PULP)

Because of the very fine particle size necessary to achieve the desired results on firing, the slurries prepared above are very subject to being rather poorly filterable. Practically, this means that when a slurry is used as a furnish to a paper-making machine, e.g. is poured onto the screen of a Fourdrinier machine, or other paper-making machine, there may be either extreme loss in the white waters or very slow drainage. Although compounding the slurry as described herein somewhat ameliorates these losses over what would be experienced using teachings of the prior art, the peptization effected by these compositions results in a slurry which, although less subject to white-water losses, may still be too slow in filtering for use in paper making technology. This effect is overcome by a flocculation step.

As prepared the particles of the slurries of the invention are negatively charged and are flocculated by positively charged flocculating agents. For this operation a solution of a flocculating agent is measured into the slurry and mixed therewith. The amount employed is enough to give a filtering time of the order of 15 to 90 seconds in a handsheet former with minimum white water loss. The precise amount for a given mixture can thus readily be determined. In general the amount of flocculating agent is from about 0.025 to 0.5 percent by weight of the total solids present in the slurry. The flocculating agent is employed as a dilute solution. Excessive amounts of the agent are largely wasteful and are avoided for that reason. The characteristic of the flocs and pulps of the invention is that they drain readily but knit together when drained to give a homogeneous structure in which individual flocs are no longer discernible. They may be described as cohesive flocs.

Flocculating agents are generally polyvalent materials, that is, they are either cations having charges of 2 or higher, e.g. $Mg^{++}$, $Al^{+++}$, $Zn^{++}$, or the like or organic polyelectrolytes in which the molecules have very large numbers of positive charges. A particularly useful group of the latter class is the partially hydrolyzed polyacrylamides. Another useful group is the polyalkyleneimines, e.g. polyethyleneimine. Other means for flocculation include acidification to neutralization emulsifiers and addition of other positively charged materials, e.g. gelatin. Combinations of different flocculating agents are also useful, for example, the above mentioned hydrolyzed polyacrylamide and zinc oxide provides exceptionally large flocs.

One important characteristic of the flocked compositions is the rapid settling achieved in pulps diluted to about 2% or less of solids. This is evident in the rapidity with which water is drained away, i.e. the pulp is deliquified, when laid on a screen. There is substantially complete removal of the excess water within about 20 to 60 seconds from a 1 inch depth of the suspension to give a greensheet containing about 60 percent of water from a flocculated slurry containing as much as 98 percent of water. The result is an increase in solids from 2 percent to 40 percent with white water losses of less than 10 percent of the total solids. The process may conveniently be considered on a weight basis:

100 lbs. flocked suspension containing 2 percent solids 4.5 lbs. greensheet ____ 95.5 lbs. white water.
(40% solids) ________ Containing 0.2 lbs. solids or less.

The rate at which sheet formation will occur will evidently depend on the rate at which the flocked suspension is discharged to the screen and the area and mesh size thereof.

Another important characteristic of the flocked suspension is the size of the flocs. In general, pulps of the invention will have flocs of an average diameter of about 1/16 to 1/8 inch as determined by visual estimation and such sizes are particularly useful for molding into greensheets of thicknesses up to about 20 to 50 mils by paper making technology. It is found that larger flocs are needed for thicker papers to give sufficiently good drainage inasmuch as the smaller flocs cohere and decrease the rate of drainage before a suitable thickness can build up. It is found that exceptionally large flocs of about 1/4 to 1/2 inch average diameter, which may be distinguished by the term curds, are obtained when the slurry contains zinc oxide constituting from about 0.5 to 2% of the total weight of solids. Soluble zinc salts in similar concentrations give a similar result. The zinc oxide is not the flocculating agent and a suitable polyelectrolyte is subsequently added to produce the pulp as in the usual procedure. There appears to be a synergistic action between the zinc compound and the rubber latex.

The peculiar value of the flocs and the larger curds is believed due to a coflocculation of the components of the slurries and the cohesive properties obtained. The flocs and curds, collectively the pulps of the invention, are thus suitable for forming sheets or for the molding of massive articles as described below. It is noted that this desirable structure of the pulps may be destroyed by excessive agitation.

IV. MOLDING OF THE PULP

The term pulp is employed herein to designate the flocculated materials as prepared above whether or not in suspension. It will be evident that removal of the bulk of the water present is necessary in the production of self-supporting unfired shapes for subsequent firing. Depending upon the particular shape to be formed any desired unit operation may be employed for the removal of the water, e.g. filtration, decantation, thickening or the like. This operation generically is termed concentration of the pulp and is desirably carried to a point where the solids content is at least about 40%.

In general, filtration, which here includes broadly casting onto foraminous or aperture screens as a Fourdrinier machine, is found very satisfactory for the formation of planar greensheets which are adapted to subsequent further shaping, e.g. corrugation and/or calendering.

On the other hand, where more massive shapes are desired, merely allowing settling of the flocs followed by decantation may serve to effect sufficient concentration so that a dough-like formable plastic mass is obtained. Plastic masses having the same characteristics may also be obtained by kneading scrap unfired materials with water because hydrophilicity is retained by the compositions of the invention until thoroughly dried and fired. Such plastic masses are generally adapted to any of the methods of forming employed by the ceramicist to provide any desired shape. They may be molded around or within other shapes made, for example, from greensheet materials where building up massive portions from the normally relatively thin greensheets could be more tedious or otherwise less convenient. These plastic masses may be molded into tile, brick and other such regular shapes and may be compressed or densified or may be made with a cellular structure, if desired, to decrease weight and consumption of relatively more costly refractory materials.

While not necessary to obtain useful shapes by the above methods from the concentrated pulps of the invention, it is found that in the formation of planar greensheets a densification operation, suitably by calendering, gives significantly stronger fired ceramic structures. Densified greensheets tend to be leathery and as a result of more intimate contact between particles undergo the desired reactions and phase changes of recrystallization on firing more readily and give fired shapes having higher apparent density than obtained from non-densified greensheets. Such fired structures are, moreover, somewhat less pervious to fluids, e.g. gases and liquids. For many purposes the degree to which densification is effected is a matter largely of the density desired in the fired ceramic, that is the free space or porosity of the greensheet may be reduced so that it approaches 5–10% or even less. For the greeensheet to be corrugatable, it is found that a porosity of about 25 to 30% is optimum. Corrugated greensheets are particularly useful in the formation of structures firable to ceramics. The ultimate porosity of such fired ceramics is further controlled by the relative amounts of organic components used and for minimum porosity the minimum amounts of organic components consistent with obtaining the other desired properties are then used.

Having thus described the invention in broad general terms, it is now illustrated in greater detail by means of specific examples showing the best mode presently contemplated of practicing the invention. In the examples where not otherwise specified, temperatures are in degrees centigrade and parts of solids are by weight.

Example 1

This example illustrates the formation of slurries, pulps and greensheets of the invention wherein the desired fired mineral species are zircon and mullite. Mullite is an aluminum silicate mineral having the approximate composition: $3Al_2O_3 \cdot 2SiO_2$. At least five combinations of mineral materials may be used in the greensheets as sources of mullite, namely synthetically prepared mullite, from fusion of alumina and silica in an electric furnace, and mixtures of alumina with suitable proportions of either silica (quartz sand), kaolin clay, untreated kyanite or calcined kyanite, kaolin clay, untreated kyanite or calcined kyanite, kaolin clay (e.g. mullite plus a silica-rich vitreous alumina-silica phase). It is recognized that volume changes on firing are somewhat disadvantageous in ceramics and hence it is preferred to use the calcined kyanite with alumina over the untreated kyanite.

A Holland-type beater is charged with 100 gallons of water and 5 lbs. of scrap paper (made from highly beaten pulp, and having about 5% moisture) and the batch is dispersed with beater roll down for 20 minutes. Fifteen pounds of a bleached western kraft long-fibered wood pulp having about 7% moisture is added and the mixture is beaten for another 15 minutes. To the batch are added successively and as rapidly as possible, while mixing with the roll up, 25 lbs. of kaolin clay, 25 lbs. of finely divided (1 to 15 microns) alumina, 125 lbs. finely divided zircon (1 to 15 microns) (available under the trade name Ultrox 500W), 7.5 lbs. of 2 to 5 micron diameter alumino-silicate mineral fibers (available under the trade name Fiberfrax), 2.5 lbs. of glass fibers (available under the trade name Fiberglas No. 106), 12.5 lbs. of 40 percent solids butadiene-acrylonitrile rubber latex (available under the trade name Hycar No. 1562) diluted with about 25 lbs. of water and finally 75 additional gallons of water. The batch now contains approximately 10% of solids. The mixture is thoroughly agitated for about 5 minutes. There is thus obtained a slurry of the invention and this is run into the Fourdrinier paper machine stock chest where agitation is maintained continuously.

The slurry is released from the stock chest to the mixing box through a gate set to deliver 45 lbs. of slurry (10% solids) per minute, where it is diluted with twice its volume of water and is then flocculated to form a pulp of the invention by metering in a solution of polyethylenimine (5 quarts of 2% solution diluted with 5 gallons of water) at the rate of 325 cc. per minute while agitating continuously. The pulp suspension thus formed runs continuously from the mixing box to the head box without agitation. From there it flows onto the 72 x 56 wire screen of the machine advancing at 17 feet per minute over 2 vacuum boxes at 15 inches of Hg vacuum and a vacuum couch roll at 20 inches of Hg vacuum. The sheet drains readily. As formed, the greensheet depends upon the cohesivity of the flocs and is unconsolidated. It passes successively through the first pressing section (5 lbs. per lineal inch between nips), the second press section (100 lbs. per lineal inch) and then through 8 heated drying rolls, each 2 feet in diameter, the temperature of drying increasing incrementally from about 150° to about 210° F. The greensheet from the end of the drying operation is 18 mils in thickness and self-sustaining. It is densified in a 5 roll calender to 15 mils caliper at nip pressure ranging from 5 to 115 lbs. per lineal inch. Pressure is increased in the last few minutes of running to twice and then thrice the original pressure to give 14 and 12 mil caliper, respectively. The total running time in the forming operation of the greensheet is about 30 minutes. The greensheet is obtained as a 24 inch wide roll containing 77 yards of leathery self-sustaining paper-like material having a basis weight (500 sheets 24 x 36 inches) of 365 lbs. White water losses average about 5% of the total weight of solids.

The greensheet thus produced fires to zircon-mullite at about 1500 to 1550° C. Undensified greensheet (from the screen before pressing) is collected, made into a paste with a small amount of water and molded into blocks suitable after firing for use as refractory liners. Molding may be accomplished manually or under mechanical pressure of about 500 to 750 p.s.i. (3000 lbs. for about 40 to 45 square inches). Ceramics resulting from the firing at 1525° C. of blocks produced in this way have porosities of about 60 to 66 percent and a bulk density of about 1.35 g./cc., a Young's modulus in bulk of about 60,000 p.s.i. and ultimate compressive strength of about 750 p.s.i.

Structures are built up from alternate flat and corrugated greensheets as produced above temporarily adhered before firing using an adhesive consisting of 100 parts of 10 percent by weight aqueous polyvinyl alcohol, 6 parts of calcined kaolin and 4 parts of very finely divided aluminum oxide and fired at 1520° C. These structures show a bulk density (allowing for voids) of 2.0 to 2.3 g./cc. and the porosity (allowing for voids) is about 45%. The Young's modulus and ultimate compressive strength for the structure is the same as that for the bulk material. These values are quite remarkable in that they show considerable elasticity. They are of an entirely different order of magnitude from those of the usual commercial bricks, fire bricks and the like porous ceramics. The latter which have ultimate compressive strengths of the same order of magnitude have Young's moduli of the order of about 400,000 to about 1,200,000 p.s.i., i.e. from 7 to 20 times as great.

Example 2

A greensheet of the invention convertible by firing to zircon-mullite refractory is prepared using the materials of Example 1 above with slight modifications in the procedure.

Two separate batches of organic fiber are beaten independently; each consists of 15 lbs. scrap of highly beaten paper (e.g. map overlay tracing paper) and 45 lbs. of bleached western long-fibered wood pulp in 200 gals. of water, beating times being as in Example 1. Each is transferred to the stock chest using a further 50 gallons of water per batch. The mineral materials and inorganic fibrous materials (all as used in Example 1) are mixed into water in a Holland-type beater and transferred to the stock chest in three portions as follows:

| Portion | 1 | 2 | 3 |
|---|---|---|---|
| Water (gals.) | 150 | 150 | 150 |
| Kaolin (lbs.) | 37.5 | 37.5 | 75 |
| Alumina (lbs.) | 37.5 | 37.5 | 75 |
| Zircon (lbs.) | 187.5 | 187.5 | 375 |
| Alumino-silicate fibers (lbs.) | 11.3 | 11.3 | 22.6 |
| Glass fibers (lbs.) | 3.8 | 3.8 | 7.6 |

To the batch in the stock chest are then added 75 lbs. (dry weight) of the 40 percent solids latex used in Example 1 diluted with 150 gallons of water and 100 cc. of a water dispersible silicone antifoaming agent (such as the commercially available Anti-Foam 60) to decrease foaming. The slurry of the invention thus obtained contains about 10%–11% solids. It is pumped from the chest and diluted with water to about 3.5% solids (by adding twice its volume of water) and then flocculated in the mixing box, using a solution of 7 quarts of 2% polyethylenimine and about 2 pints of antifoaming agent diluted to 5 gallons with water, metered into the slurry at about 315 cc. per minute to give a pulp of the invention.

The pulp is formed into a greensheet of the invention using a Fourdrinier machine as above with 70 x 56 wire screen at an initial speed of 16 feet per minute, increased to about 22 feet per minute after 70 minutes. The total time for the forming operation (to exhaustion of the stock) is about 170 minutes. Vacuum boxes and vacuum couch roll are maintained at 13 and 24 inches Hg vacuum respectively and drying conditions are approximately those of Example 1. As formed the greensheet is about 21 mil caliper and it is densified using 375 lbs. per lineal inch pressure to about 15–16 mil caliper. During operation of the Fourdrinier, losses of mineral materials are determined by analysis of samples of the white water passing through the screen. Random variation is found which is apparently associated only with the extent to which mixing is not entirely efficient. Actual white water losses are very low (well below 10%). The total web is 937 yards of 24 inch width in two large rolls of approximately 380 lbs. basis weight.

Example 3

An alumina greensheet is prepared using the equipment described in Examples 1 and 2 above, as follows.

A slurry of the invention is made up in two batches. In each batch 12.5 lbs. of highly beaten paper scrap (e.g. map overlay tracing paper) and 25 lbs. of bleached western long-fibered kraft wood pulp are beaten in 150 gallons of warm water (145° F.) as described above. About 50 cc. of antifoaming agent is incorporated in each batch. To each batch are added 168 lbs. of finely divided (1 to 10 microns) alumina, 34 lbs. of hydrated alumina (available commercially as Alcoa C–741) 2.5 lbs. of Imperial Yellow B pigment (added to color code the batch), 13 lbs. of aluminum sulfate (dry solids basis) and 16.5 lbs. (dry solids basis) of butadiene-acrylonitrile synthetic rubber latex (available under the trademark name Hycar as 40% suspension) diluted with 20 gallons of water. The batches are thoroughly mixed and both are transferred to the stock chest to give a slurry containing about 12% solids at a temperature of 132° F., pH about 5.

The slurry is flocculated to a pulp of the invention by metering in (at 500 cc./min.) a 1% solution of a partially hydrolyzed polyacrylamide flocculating agent (commercially available under the name Separan NP–10) containing 500 cc. of a defoamer in 5 gallons of the solution.

The pulp is formed into a greensheet of the invention on a Fourdrinier machine as described above using 20–30 feet per minute screen speed to give approximately 20 mil caliper self-sustaining greensheet, basis weight 406 lbs., tensile strength 10.6 lbs. per inch of width.

Example 4

Two comparative mullite greensheets are prepared using the above detailed procedures for beating and forming. The slurries are prepared from the materials shown in the following table (these, where not otherwise specified, being of the types hereinabove indicated). The organic fiber is beaten for 20 minutes to assure hydration. This example illustrates the use of different compositions to give fired sheets of like composition.

| Lot | 1 | 2 |
|---|---|---|
| Beater water (gals.) | 100 | 100 |
| Bleached woodpulp (lbs.) | 14 | 20 |
| Alumina (lbs.) | 49 | |
| Calcined kyanite (commercial −325 mesh) (lbs.) | 91 | 180 |
| Kaolin clay (lbs.) | 21 | 45.5 |
| Zinc oxide (C.P. very fine) (lbs.) | 3.5 | 5 |
| Glass fibers (lbs.) | 3.5 | 5 |
| Synthetic rubber latex (lbs. dry weight) | 13.5 | 18 |
| Aluminum sulfate (lbs. dry weight) | 7 | 10 |
| Mixing water (gallons) | 100 | 200 |

Both lots are formed into greensheets using 1 percent aqueous solution of partially hydrolyzed polyacrylamide added at 330 cc. per minute to flocculate to pulps as described above. The greensheets are very similar in properties and appearance, that from lot 1 to 19 mil caliper, that from lot 2 is 14.5 mil, both after calendering. Both are fired at about 1550° to 1600° C. to give mullite ceramics having substantially similar properties.

Example 5

This example illustrates the formation of slurries, pulp, greensheets and fired cordierite ceramics according to the invention, particularly as carried out where only small greensheets are required.

Three different slurries (designated as lots A, B and C) are prepared from the following mineral materials and fibers. The two kaolinites are from different commercial sources.

| Lot | A | B | C |
|---|---|---|---|
| Water (cc.) | 600 | 480 | 520 |
| Kaolinite (g.) (source I) | | 6 | 6 |
| Kaolinite (g.) (source II) | 6 | | |
| Hectorite [1] (g.) | 6 | 6 | 6 |
| Alumino-silicate fiber (g.) | | | 2 |
| Bleached kraft pulp (g.) | 1.2 | 1.2 | 2.4 |
| Polyethylenimine (cc. 0.1% solution) | 7 | 20 | 20 |

[1] Employed as aluminum-exchanged material by a preliminary suspension in a solution of aluminum sulfate.

The kaolinite and hectorite materials are beaten together in the water (they may conveniently be handled as about 2–3% suspensions and measured volumetrically) for 30–35 seconds using a high-speed propellor beater such as a Waring Blendor and the fibrous materials are then incorporated and beaten in for about a further 30 seconds. In such high speed mixing procedures some hydration of the wood fibers occurs in addition to the hydration of the aluminum-exchanged clay. There are thus obtained slurries of the invention.

The slurries are flocculated using the polyethylenimine solution to provide pulps of the invention. These are formed into greensheets by casting into a handsheet former consisting essentially of a 100 mesh steel screen secured in the bottom of a 1 gallon capacity container and having a releasable closure at the bottom such that no flow occurs until the closure is tripped and water then passes through the screen freely. On a small scale the handsheet former provides results comparable to those obtained on a larger scale in a Fourdrinier machine. Individual sheets are about 8½ inches square. They are first pressed between blotters to remove the bulk of retained water, i.e. dewatered, and then stripped from the screen and dried in air on a drying plate (e.g. a photographic print dryer can be used successfully) at about 200° F. In order to provide comparable results in the handsheet former, each pulp is diluted to a depth of 1 inch with water before releasing the closure. The three pulps, A, B and C drain completely in 90, 80 and 60 seconds respectively and the flocs (about 1/16 inch diameter) cohere. There is substantially no loss of mineral in the white waters. The uncalendered sheets are about 12 mils thick, of a grayish color and have good wet strength when removed from the screen. After drying the greensheets are firm. They can be calendered to about 8 to 10 mils thick and are then somewhat more flexible and leathery. They can be corrugated.

Strips of each of the above greensheets are cut about 0.5 inch wide and placed in porcelain crucibles and fired by heating slowly over a period of 4 to 8 hours to 1350° (for A) to 1400° (for B and C).

The ceramic from A is found to have shrunk about 4% to a strong, white opaque ceramic. Microscopically it is found to consist essentially of cordierite crystals interlocking with each other. It contains some untransformed glassy phase from the mineral fibers which tends to retain the elongated structure, together with some other vitreous phase.

The ceramics from B and C show a shrinkage of about 12–13% owing to the higher firing temperature and the absence of mineral fibers. They are white, somewhat translucent, semi-vitreous sheets exhibiting slight deformation after firing. The material is strong and consists essentially of interlocking crystals of cordierite and a second microcrystalline phase of high refractive index, probably mullite.

Example 6

This example further illustrates the formation of greensheets of the invention and the means by which properties of fired ceramics are improved both in firing and in the composition employed in making the greensheet. These lots are designated D, E, F, G, H, I and J.

| Lot | D | E | F | G | H | I | J |
|---|---|---|---|---|---|---|---|
| Bentonite,[1] g. dry weight, (in 2% suspension) | 12 | 4 | 8.4 | 12 | 6 | .2 | 2.5 |
| Hectorite, [1] g. dry weight (in 2% suspension) | | | | | | 5.5 | |
| Talc (g.) | | 5 | | | | | 4.75 |
| Kaolinite (g.) | | | | | | 3.9 | 3.2 |
| Aluminum oxide (g.) | | 3 | 1.9 | 1.9 | | | 2.56 |
| Aluminum metal (g.) | | | | | | 1.6 | |
| Magnesium hydroxide (g.) | | | 1.7 | 1.7 | | | |
| Alumino-silicate fibers (g.) | 2 | 2 | 2 | 2 | 2 | 2 | .75 |
| Bleached kraft paper pulp, (g. dry weight) | 1.2 | 1.2 | 1.2 | 1.2 | 1.2 | 1.2 | 1.2 |
| Water (cc.) | 300 | 400 | 200 | | 300 | 225 | 200 |
| Butadiene-acrylonitrile latex (g. dry weight) | | | | | | 0.5 | 0.5 |
| Polyethylenenimine (cc. of 0.1% solution) | 10 | 15 | 15 | 12 | 12 | | 5 |
| Fired (° C.) | 1,350 | 1,350 | 1,350 | | 1,500 | 1,380 | |
| Microscopic characterization | (2) | (3) | (4) | | (5) | | |

[1] Previously exchanged with aluminum sulfate in aqueous suspension
[2] Glass plus cordierite.
[3] Less glass.
[4] More mullite.
[5] Cordierite plus ca. 15% mullite.

Example 7

A synthetic cordierite is made for use in formulation of slurries pulps and greensheets of the invention by thoroughly blending 471.3 g. of kaolinite, 395.7 g. of talc and 133.0 g. of alumina (all being in very finely divided form) and the blend is then packed in two crucibles. One crucible is fire at 1300° C. for 4 hours, the other is fired at 1400° C. for 2 hours. The synthetic cordierite thus obtained is maintained as two separate batches, pulverized to −325 mesh and incorporated in compositions as shown in the following table.

| Lot | I | J | K | L | M | N |
|---|---|---|---|---|---|---|
| Bentonite (cc. of 2% suspension, Al-exchanged) | 150 | 200 | 300 | 150 | 200 | 30 |
| Synthetic cordierite (1,300°, g.) | 9.0 | 8.0 | 6.0 | | | |
| Synthetic cordierite (1,400°, g.) | | | | 9.0 | 8.0 | 6.0 |

In each lot the suspension of aluminum-exchanged bentonite is diluted with water to give 600 cc., the cordierite is added together with 60 cc. of a 2% paper pulp suspension and the mixture is blended together in a Waring Blendor for 1.5 minutes to provide a slurry. To each lot is then added 15 cc. of a 2% solution of polyethylenimine to flocculate to a pulp, and the suspension of pulp is placed in a hand sheet former as described above and drained. Drainage time is found to be from 35–40 seconds. The greensheets are readily stripped from the screen and are about 18 mils thick. They are calendered under about 10 lbs. per inch roll pressure to a thickness of about 10 mils. They are then manipulable such as paper although as will be seen they contain over 90% of mineral materials. After air drying, strips are cut with scissors and placed in porcelain crucibles and fired first for 0.5 hour at 100° to 400° C. to burn out organic matter and then for 1 hour at 1350° C. Shrinkage is found to be, respectively, 6, 9, 8, 13, 14 and 15% linearly. Microscopic examination using standard petrographic techniques shows that lots of comparable composition, i.e. I and L, J and M and K and N have substantially similar structure and compositions. The 3 groups show progressively lower proportions of cordierite from about 75% to about 50%, the balance being substantially mullite.

Example 8

This example illustrates the use of aluminum powder as a mineral material in the preparation of slurries, pulps and greensheets of the invention as a source of aluminum oxide to minimize the shrinkage on firing sometimes observed for greensheets containing large proportions of aluminum oxide.

The aluminum powder in flake form is incorporated in the proportions shown in the following table:

| Lot | O | P | Q | R | S | T | U |
|---|---|---|---|---|---|---|---|
| Bentonite (cc. of 2% suspension; Al-exchanged) | 400 | 300 | 340 | 340 | 340 | 175 | 300 |
| Hectorite (cc. of 2% suspension; Al-exchanged) | | | | | | 175 | |
| Talc (g.) | | | | | | 3 | |
| Kaolinite (g.) | | | | | | 2 | 2 |
| Aluminum oxide hydrated (g.) | | | 5.8 | 3.8 | 1.8 | | |
| Aluminum metal (g.) | 4.0 | 6.0 | 2.08 | 3.12 | 4.16 | .75 | 5.5 |

The mineral materials as shown in the table are combined with sufficient water to make 600 cc. and to each lot are added 60 cc. of 2% paper pulp suspension and 0.75 g. of aluminosilicate fibers (except U in which 0.5 g. of borosilicate glass fibers are used) and the suspensions are blended as above described for about 1.5 mintues to produce slurries of the invention, each of which is floccuated to a pulp by the addition of 20 cc. (15 cc. for Lot U) of 2% aqueous polyethylenimine solution and formed into a greensheet as above described. All are found to drain readily and the resultant greensheets to be readily removed from the screen and to be easily handleable. Very little white water loss is noted. Portions of each greensheet are also calendered to effect densification and strips of uncalendered greensheets of each lot and calendered sheets of lots O, P, Q, R, S and U are fired first at about 600° C. For 16 hours to effect burn out of the organic fibers and oxidation of the aluminum metal to aluminum oxide and then at about 1530° C. for 1 hour to effect ceramification to yield mullite and alumina-mullite bodies. A strip from lot T is fired at 1325° C. to give a cordierite body. The uncalendered greensheets are found to have shrunk 8, 7, 20, 13, 7, 11 and 6.5% linearly respectively (Lots O through U). The high shrinkage of the compositions initially high in aluminum oxide is again indicative of the difficulties inherent in the production of structures containing alumina in thin sheets by heretofore available methods.

The calendered strips shrink 1.5, 2, 15, 6 and 4% linearly respectively (Lots O through S). The same greensheet as gives the high shrinkage (Lot Q) also shows some tendency to warping or slumping on firing. All are hard, strong, well recrystallized ceramics. The ceramics from lots P and S are found subjectively to be most satisfactory in all respects.

The ceramic from lot T is a fine grained cordierite, those from all the other lots are mullite with varying amounts of alpha-alumina e.g., about 5% in lot O, about 10–15% in lot U, about 30–40% in lots P and S. The small amounts of MgO present from the bentonite are apparently included in a minor amount of spinel in the fired bodies.

Portions of the greensheets of Lots O, P, Q, R and S are corrugated by passage between mating corrugating rollers. The sheet from Lot Q corrugates poorly with a tendency to crack at the bends; that from Lot R was somewhat better, those from Lots O, P and S are corrugated very satisfactorily.

Example 9

Improvement in internal lubrication of greensheets of the invention may be achieved by incorporation of and coflocculation with latices of elastomers. A series of greensheets is prepared from materials used above so that for each the following are used:

Suspension of Al-exchanged bentonite 2% ____cc__ 300
Aluminum powder ________________________g__ 5.5
Kaolinite ________________________________g__ 2.0
Aluminosilicate fibers _____________________g__ 0.75
Aqueous paper pulp suspension 2% ________cc__ 60
Water ___________________________________cc__ 300 together with variable amounts of two different elastomer latices as follows:

1.2, 5.0 and 12 cc. of 40.8% solids latex of butadiene-acrylonitrile (available under the trade name Chemigum Latex 246)

0.8, 3.5 and 12.0 cc. of 62.1% solids latex of butadiene-styrene (available commercially under the trade name Pliolite 2105)

The total content of solids (excluding the latex employed) is 21 g. calculating the aluminum metal as the oxide. Including the latex employed, the above amounts of latex then correspond, in percents by weight, respectively, to about 2.3, 8.7 and 19 of butadiene-acrylonitrile and about 2.3, 9.5 and 26 of butadiene styrene.

After blending as described in Example 8 above, 10 cc. of 1% polyethylenimine solution is added to each. It will be seen that these compositions thus contain from about 3 to about 25% by weight of elastomer on the dry weight basis. In each case sheet formation as described above is very satisfactory with drainage times of about 60 to 75 seconds and substantially no white water losses. The greensheets release from the screen readily.

Portions of the several greensheets are calendered and strips are then fired up to 1500° C. in 7 hours and examined for the properties of the resultant ceramics. Shrinkage is found to be of the order of 1%. All consist essentially of recrystallized mullite with an estimated 10–15% of alpha-aluminum. Greensheets calendered at high pressures are similar to or occasionally not quite as good as those calendered at lower pressures. The butadiene-acrylonitrile latex seems to confer somewhat more satisfactory properties on the greensheet and resultant ceramic than does the butadiene-styrene latex.

Portions of the several handsheets are corrugated to about 7 corrugations per inch each being about 3/16 inch in height by passage through the nip of mating corrugating rollers. Surprisingly it is found that higher applied pressures and higher elastomer contents in the greensheets result in poorer corrugatibility with more tendency to crack formation at bends than do lower applied pressures and median or low amounts of elastomer.

Similar results are found when these and other latices are incorporated in other compositions. For example, a slurry of 3.6 parts kaolin, 3.6 parts aluminum, 17.9 parts milled zircon, 1.0 part of alumino-silicate fibers, 0.36 part glass fibers, 2.8 parts bleached western long-fibered woodpulp and 420 parts of water with 0.7 part (solids weight) of latex are flocculated with 5 parts by volume of 1% solution of partially hydrolyzed acrylamide (available commercially under the trade name Separan NP–10). Latices which give useful results with low white water losses include polybutadiene-acrylonitrile, polybutadiene-styrene and polyacrylate rubber. In general it is found that elastomer latices are superior to latices of other polymers in the properties conferred on both pulps and greensheets of the invention.

Example 10

This example illustrates the formation of greensheets of the invention particularly intended as separator sheets for hot pack rolling of metal billets. Such sheets are made somewhat thinner than for the formation ceramics, e.g. about 5 to 10 mils instead of 10–20 mils. The materials employed for the formation of a series of such greensheets having different composition are shown in the following table:

| Lot | V | W | X | Y |
|---|---|---|---|---|
| Al-exchanged bentonite (g.) | 5 | 2 | | |
| Chromium oxide ($Cr_2O_3$) (g.) | | 3 | 5 | |
| Talc (g.) | | | | 5 |
| Aluminum sulfate (10% solution) (cc.) | 20 | 10 | 5 | 5 |
| Bleached kraft woodpulp (g.) | 1 | 1.0 | 0.4 | 0.4 |
| Map overlay tracing paper pulp | | 0.2 | | |
| Glass fibers (0.5 to 0.8µ diam.) | | | 0.2 | 0.2 |
| Butadiene-acrylonitrile latex (1%) (cc.) | 10 | 20 | 20 | 20 |
| Water (cc.) | 150 | 200 | 200 | 200 |

The material except for the latex are combined in each case with the water and beaten on a Waring Blendor for 1.5 minutes. The latex is added and mixed in, followed in each case by 5 cc. of a 1% solution of partially hydrolyzed acrylamide. The aluminum sulfate serves primarily to control the pH to a desirable degree of acidity.

Good flocking to a pulp is realized in each case and the several pulps are collected individually on the hand-sheet paper-former as described above. Drainage time varies from about 9 to 15 seconds with substantially no white water loss in any case. The sheets are from 3–7 mils thick in various parts of the different sheets and are generally paper-like in their manipulative properties. These are employed as separators between billets and are found to be effective to prevent adhesion of the billets during the hot pack rolling operation.

Example 11

This example illustrates the formation of a zirconia sagger plate from pulps and greensheets of the invention. This example also illustrates that zinc oxide is found to sensitize the slurries of the invention so that remarkable large curt-like flocs can be obtained using e.g. partially hydrolyzed polyacrylamide as a flocculating agent. These large curd-like flocs can be obtained using e.g. partially tion of heavy cardboard-like greensheets which are not as readily formed when the flocculating agents are employed alone. There is thus a synergistic action. This permits the use of papermaking technology in the fabrication of ceramics having thickness of about ⅛ inch to 1 inch or more. The compositions are shown in the following tabulation:

| Lot | I | II | III | IV |
|---|---|---|---|---|
| –100 mesh ZrO₂ (stabliized, g.) | 600 | 800 | 500 | 400 |
| –325 mesh ZrO₂ (g.) | | | 300 | 400 |
| Bleached long-fibered kraft wood pulp (g.) | 60 | 80 | 80 | 80 |
| 10% aluminum slufate solution (cc.) | 225 | 300 | 300 | 300 |
| 1% butadiene-acrylonitrile latex (cc.) | 1,500 | 2,000 | 2,000 | 2,000 |
| ZnO (low micron powder, g.) | 12 | 16 | 16 | 16 |
| Hot water (55° C., liters) | 3 | 3 | 3 | 3 |
| Partially hydrolyzed polyacrylamide (1% aqueous, cc.) | 100 | 120 | 80 | 60 |

The compositions are combined in hot water as above and beaten and then the flocculating agent is mixed in. Very large flocs (¼ to ½ inch) are obtained in each case and the pulps are cast into the hand sheet former as above and drain rapidly (within 60 seconds) to give greensheets about ½ inch thick. These are readily removed from the screen and are densified after partial drying by application of 100 tons of pressure (per 64 square inches). Samples are cut and fired at 100° to 500° C. for ½ hour and then at 1620° C. for 1 hour. There is about 4–5% shrinkage in all dimensions during firing. The resulting sagger plates are substantially pure zirconium oxide and are suitable as supports for the firing of titania and other non-siliceous ceramic objects.

Example 12

Many compounds are found to exert greater or less effect on the recrystallization of ceramics during firing and are termed mineralizers. This example illustrates the use of zinc oxide as a mineralizer in compositions of the invention convertible to mullite as well as the sensitization of slurres of the invention. The compositions employed are as follows:

| Lot | V | VI | VII |
|---|---|---|---|
| Alumina (Alcoa A-2, g.) | 29 | 11 | 95 |
| Flint (silica, -325 mesh, g.) | 11 | | |
| Kyanite (raw, -325 mesh, g.) | | 29 | |
| Kaolin (g.) | | | 105 |
| Zinc oxide (low micron, g.) | 1 | 1 | 5 |
| 10% aluminum sulfate solution (cc.) | 5 | 5 | 25 |
| Kraft wood pulp (g.) | 3 | 3 | 15 |
| Glas fiber (g.) | 1 | 1 | 5 |
| 1% butadiene-acrylonitrile latex (cc.) | 100 | 100 | 500 |
| Water (cc.) | 500 | 500 | 2,500 |

The ingredients are combined as in earlier examples, adding the latex last. The smaller lots are beaten 1.5 minutes. The larger lot (VII) is beaten for 2 minutes in a large high speed comminuting mixer, e.g. a Waring Blendor, and three such lots combined. Flocculation to pulps of the invention is effected employing 1% aqueous partially hydrolyzed polyacrylamide as above; 10 cc. for Lots V and VI, 40 cc. for Lot VII. Each pulp is cast into a hand sheet. The two smaller lots give paper like sheets which are densified and then fired at 1600° C. for 1 hour after a preliminary firing to destroy organic matter for ½ hour at 100–500° C. The three lots made using kaolin are combined and cast on the hand sheet former. Drainage is excellent and a heavy board about ⅞ inch thick is obtained. It can be densified by application of pressure before firing. All fire to mullite bodies of good structure with some interstitial vitreous material but no evidence of unreacted alumina.

Example 13

The procedure described above, for example, in Example 5, is generally applicable to fabrication of slurries, pulps and greensheets of the invention from suitable formulations. The four compositions shown below in tabular form (ingredients being similar to those hereinelsewhere employed) are processed as described above and provide greensheets containing zirconium compounds (ZrO₂ or zircon) as indicated:

| Lot | AA | BB | CC | DD |
|---|---|---|---|---|
| Water (cc.) | 200 | 400 | 400 | 550 |
| Zirconia (g.) | 40 | | 9 | |
| Zircon (g.) | | 21.6 | | 26 |
| Alumina (g.) | | 18.4 | | |
| Mullite (synthetic, g.) | | | 31 | |
| Kaolin (g.) | | | | 6 |
| Talc. (g.) | | | | 3 |
| Alumino-silicate fiber (g.) | | | | 1.5 |
| Glass fiber (g.) | | | | 0.5 |
| Wood pulp fiber (g.) | 3 | | | 4 |
| Map overlay tracing paper scrap (g.) | 2 | 3 | 3 | |
| Butadiene-acrylonitrile latex (cc. of 1%) | 200 | 100 | 100 | 75 |
| Aluminum slufate (cc. of 10% solution) | 10 | 10 | 10 | 10 |
| Separan NP-10 [1] (1% solution) | 10 | 10 | 10 | 10 |
| Flock size (in.) | ⅓ | ¹⁄₁₆ | ¹⁄₁₆ | ¹⁄₁₆ |
| Drainage time (sec.) | 15 | 30 | 20 | 25 |
| Firing temp. (° C.) | 1,620 | 1,660 | 1,660 | 1,325 |
| Shrinkage (percent) | 13 | 3–4 | 21 | 5 |

[1] Trade name of commercial partially hydrolyzed polyacrylamide.

The greensheets from the above formulations provide zirconia (AA), zirconia-mullite (BB and CC) and zircon-cordierite (DD) ceramics. It will be seen that at the temperature of firing employed, the zircon in composition BB inverts to zirconia and silica which latter reacts with the alumina to give mullite. The fired ceramic thus obtained is somswhat finer grained than that from CC although otherwise substantially identical. The fired ceramics are examined microscopically and found to contain the respective phases indicated above.

Example 14

Slurries of the zircon-mullite composition of the last paragraph of Example 9 are prepared using a polybutadiene-acrylonitrile latex and flocculated with 5 cc. of 1% solutions of various flocculating agents. It is found that flocculating agents having many positive charges i.e. cationic flocculating agents, are especially effective in the formation of cohesive flocs and in avoiding white water losses when the pulps are water-laid. These effective flocculants include aluminum sulfate, polyethylenimine, partially hydrolyzed polyacrylamide and gelatin. A partially hydrolyzed polyacrylonitrile (available under the trade name Aerofloc 550) is somewhat less satisfactory. Anionic and neutral flocculants and substances having low charges, e.g. ethanolamine, are signifiicantly less effective and may be considered not useful alone, although sometimes useful in conjunction with cationic flocculating agents. Thus, as little as 0.4 mgm. of polyacrylic acid in solution is found to sensitize the slurry so that when flocculated as above using polyethylenimine or hydrolyzed polyacrylamide there is improved retention of the pulp on the screen and substantially no white water loss.

Example 15

This example illustraees the preparation of greensheets of the invention, together with the intermediate slurries and pulps therefor, which are convertible on firing to ferrite spinels or which comprise ferrite spinels.

A slurry is prepared in 300 parts of water to contain 9.6 parts of finely powdered basic copper carbonate ($CuCO_3.Cu(OH)_2$), 13.4 parts of very fine ferric oxide, 1.5 parts of bleached long-fibered kraft wood pulp, and 1.5 parts of leached glass fibers by first beating in the fibers on a Waring Blendor for about 30 seconds, adding the other materials and again beating for about 30 seconds and then slowly adding with mixing 0.75 part of polybutadiene-acrylonitrile elastomer (dry weight basis) as the latex diluted to 400 parts with water. The slurry is flocculated by stirring in 5 parts by volume of a 1% solution of partially hydrolyzed polyacrylamide. The flocs in the pulp are about ⅛ inch in diameter. They are cast on a handsheet former as above (drainage time about 20 seconds) to give a greensheet of the invention with very little white water loss even of the very finely divided ferric oxide. The uncalendered sheet is about 22 mils thick. It is calendered to a leathery greensheet. Strips are cut and fired to about 1300° C. in air. The black ceramic piece thus produced is attracted by a magnet but not permanently magnetized thereby. It serves as a keeper. The ferrite sheet is strong and electrically non-conducting. X-ray diffraction analysis confirms the cubic spinel structure and shows the presence of a trace of cristobalite.

Other ferrite spinels are made by the same procedure by employing suitable compounds of other metals and changing the amount of ferric oxide appropriately as shown in the following tabulation:

| Ferrite Spinel | Metal compound Used | Parts of— Compound | Parts of— Ferric Oxide |
|---|---|---|---|
| $MnFe_2O_4$ | $MnCO_3$ | 10.0 | 13.8 |
| $ZnFe_2O_4$ | $ZnO$ | 6.8 | 13.2 |
| $CoFe_2O_4$ | $2CoO.3Co(OH)_2.H_2O$ | 9.1 | 13.6 |
| $MgFe_2O_4$ | $MgO$ | 4.0 | 16.0 |

In each case self-sustaining greensheets are obtained which fire to ferromagnetic ferrites. The greensheets can be formed as desired, calendered, corrugated and otherwise molded to desired shapes.

Another procedure for the production of ferrite greensheets provides ferromagnetic greensheets, that is possessing ferromagnetic properties before firing. In this procedure the ferrite spinel is formed first and then pulverized and incorporated in a composition to provide greensheet of the invention. Thus, 196 parts of basic copper carbonate and 268 parts of ferric oxide are blended together as dry powders and packed in a suitable vessel and fired at 1400° C. for 5 to 8 hours. The resultant black ferrite body is broken up and ball milled. The powdered ferrite is screened and 40 parts of the ferrite which passes a 200 mesh screen are added to a suspension (beaten as above for about 30 seconds) of 1.5 parts each of bleached long fiber kraft paper fibers and scrap map-overlay tracing paper and the slurry is then beaten for a further 30 seconds. To the slurry are added 0.5 part (dry weight) of polybutadiene-acrylonitrile latex in 300 parts of water and the whole is mixed. A pulp of the invention is formed by gently adding 5 parts of a 1% solution of polyethylenimine and it is then cast on a handsheet former as above. The greensheet is removed from the screen and calendered to a thickness of about 11 to 13 mils. It is black and leathery and is ferromagnetic. It is fired to a ferromagnetic ceramic.

Example 16

This example further illustrates the sensitization of slurries of the invention by zinc oxide and the formation of ceramics having remarkable mechanical properties from greensheets of the invention.

A slurry is prepared by the beating procedures used hereinabove containing: 9 liters of water, 165 g. of finely divided alumina, 135 g. of kaolin, 450 g. calcined kyanite, 15 g. of finely divided zinc oxide, 9 g. of ferric oxide, 150 cc. of 10% aqueous aluminum sulfate solution, 30 g. of bleached western long-fiber wood pulp, 15 g. of very fine glas fibers, 75 g. of alumino-silicate refractory fibers and 1500 cc. of a 1% latex of polybutadiene-acrylonitrile elastomer. The slurry is flocculated to a curd-like pulp with large average size by addition of 160 cc. of a 1% solution of partially hydrolyzed polyacrylamide.

The pulp is separated into three substantially equal portions and each portion in turn is cast onto a 8.5 by 8.5 handsheet former as above and drained to a 2.5 inch thick deliquified greensheet in which the cohesivity of the flocs is sufficiently great that the greensheet can be removed from the handsheet former and further dewatered and shaped employing screens and blotters in a hydraulic press without confining the edges of the greensheet. The flocs of pulps of the invention appear to possess a somewhat reticulated structure. Because of the still very high water content (estimated at about 75% by volume), care must be exercised, particularly at first, that pressure is applied rather gradually to avoid initiating flow or extrusion from the unconfined edges of the greensheet. One of the greensheets is compressed to a flat board 9/16 inch thick, the other two to arcuate boards of the same thickness. The three pieces are further dried and fired at 1515° C. for 4 hours (organic matter being burned out at lower temperatures) to give hard mullite ceramic shapes having about 33 percent porosity. Shrinkage during firing is about 7 percent on the flat board and about 10 percent on the arcuate pieces. The zinc oxide and ferric oxide also serve as mineralizers. The pieces are cut to fit in an auto muffler casing having an approximately 8 by 5 inch elliptical cross-section and placed therein. They are subjected to testing for mechanical properties and thermal shock resistance. The unit is mounted so that it is shaken up and down 1500 times per minute so that the shock is approximately three times the force of gravity. The unit is fitted so that gas flame and cold air change the temperature of the interior from about 2200° to about 250° F. at 3 minute cycles. The test is started and after two months of continuous stress the mullite shapes are found to be intact without failure or cracking indicating an unusual combination of mechanical strength and elasticity together with excellent thermal shock resistance.

Example 17

This example illusrates an embodiment of the invention in which a composite laminated greensheet is formed hasing a facing of one composition—in this example chosen for resistance to the lead particulate matter in gasoline combustion products—and the body is chosen for its superior thermal shock and mechanical properties. It will be understood that facings can be placed on both sides to give a sandwich construction and the relative thicknesses of the laminae may be varied as desired. For most satisfactory properties in the fired ceramic, the pulps employed are chosen to give ceramics of like thermal expansion and greensheets having like shrinkage on firing. The cohesivity of the dewatered pulps effects bonding of the laminae into integral composite greensheets.

Two pulps are made employing ingredients of the types, i.e. as to particle size, etc., used above. Three batches of slurries of the invention each consisting of 3000 cc. of water (at 55° C.), 150 g. of fine zircon, 50 g. of kaolin, 5 g. of zinc oxide, 5 g. of bleached wood pulp, 5 g. of very fine glass fiber, 25 g. of alumino-silicate refractory glass fibers, 500 cc. of 1 percent solids polybutadiene-acrylonitrile elastomer latex and 50 cc. of 10 percent aqueous aluminum sulfate solution are prepared and each is flocculated to a large curd pulp by addition of 50 cc. of a 1 percent solution of paritally hydrolized polyacrylamide.

One other batch of a slurry of the invention is prepared from 2500 cc. of water (55° C.), 45 g. finely divided alumina, 55 g. of kaolin, 3 g. of zinc oxide, 3 g. of ferric oxide, 7.5 g. of bleached wood pulp, 2.5 g. of fine glass fiber, 8.0 g. of alumino-silicate refractory glass fiber, 250 cc. of a 1 percent polybutadiene-acrylonitrile elastomer latex and 30 cc. of 10 percent aluminum sulfate solution and it is flocculated to a pulp by addition of 25 cc. of a 1 percent solution of partially hydrolized polyacrylamide.

The first three batches (all containing zircon) are cast onto a hand sheet former and drained to deliquefy the pulp to a wet greensheet. Without removing or excessively disturbing the wet greensheet, the last above batch (not containing zircon) is cast on top of the greensheet in the handsheet former and deliquefied. The composite greensheet is removed from the screen and dewatered and compressed as described in Example 16 above to give a board ½ inch thick which is fired at about 1520° C. to a composite ceramic laminate of integral structure having a porosity of about 35 percent. Shrinkage on firing is about 15 to 18 percent. Three-quarters of the thickness of the laminate is zircon-mullite; the facing, one-quarter of the thickness, is mullite free from zircon.

Pieces of this laminate are fiitted in a muffler-casing as described in Example 16 and subjected to cyclical mechanical and thermal shock for two months as there described. No evidence of failure due to cracking or delamination is seen.

We have described our invention so that it will be readily understood by those skilled in the art to have wide applicability in the formation of slurries, pulps, greensheets convertible to ceramics and particularly useful novel ceramic compositions. It will be understood that the invention also contemplates the fabrication of unfired structures of diverse shapes and formats from the greensheets hereof by molding, pressing, corrugating, bonding, adhering, cutting and other techniques known to the art.

What is claimed is:

1. A composition of matter, adapted to the fabrication of essentially recrystallized ceramic products consisting essentially, on a dry weight basis in percent by weight, of solids cohered in combination in the proportions of:
    (I) from about 70 to about 92 percent of particulate non-fibrous materials smaller in individual particle dimension than 100 mesh consisting essentially of inorganic particles and including optionally up to 10% of said solids of elastomer latex particles and
    (II) from about 30 to about 8 percent of fibrous material having an average diameter from about 0.2 to about 10 microns and length up to about 1 centimeter; at least a portion of said fibrous material being 5% or more by weight of said solids of ground or macerated cellulosic fibers;
said solids being further characterized:
            (a) by having a content of water-insoluble organic materials of not more than about 30% by weight consisting essentially of at least one of
                (A) ground or macerated cellulosic fibers and
                (B) elastomer,
            (b) at least one of said solids being hydrated in contact with water,
            (c) the total inorganic content of said solids being elements of valence no greater than four having ionic radii below about 0.9 Angstrom units and coordination number to oxygen of 4 to 6 inclusive, being summarized when calculated as oxides, by the volume designated ABCDEFGHI in FIGURE 2 and
            (d) said solids containing no more than about 3 mole percent, calculated as the oxides, of alkali and alkaline earth elements having ionic radii above about 0.9 Angstrom units.

2. A composition of matter according to claim 1 wherein the water-insoluble organic material is from 5 to 30% by weight of ground or macerated cellulosic fibers.

3. A composition of matter according to claim 1 wherein the content of elastomer is from 1 to 10 percent.

4. A composition of matter according to claim 1 wherein the content of elastomer is from 2 to 4 percent.

5. A composition of matter according to claim 1 wherein the non-fibrous materials are selected so that particulate inorganic materials have a spectrum of particulate sizes.

6. A composition of matter adapted as a ceramic greensheet to the fabrication of essentially recrystallized ceramic structures having the dry weight basis composition according to claim 1 and additionally containing up to about 75% by weight of water.

7. A composition of matter according to claim 6 in sheet form having a thickness of from about 10 to 50 mils and a porosity of about 25 to 30 percent by volume and being adapted to mechanical corrugation.

8. A composition of matter according to claim 6 in stratified integral sheet form consisting of laminae of compositions having like shrinkage on firing to the same temperature, said compositions being converted on firing to refractory mineral species hvaing like coefficients of thermal expansion.

9. A composition of matter according to claim 6 adapted to firing to ferromagnetic ceramics wherein the total inorganic content of the solids consists of substantially stoichiometric proportions of ferric and magnesium oxides and the diadochic equivalents of said oxides.

10. A composition of matter adapted to the fabrication of unfired ceramic structure consisting essentially of
    (1) from about 98 to 40 percent by weight aqueous vehicle and
    (2) from about 2 to 60 percent by weight of solids cohered in combination in flocked particles having a dry weight basis composition according to claim 1.

11. A composition of matter according to claim 10 adapted as a papermaking furnish to the fabrication of ceramic greensheets by papermaking methods consisting essentially of
    (1) from about 98 to 80 percent by weight of aqueous vehicle and
    (2) about 2 to 20 percent by weight of suspended solids cohered in combination in flocked particles having an average diameter of at least about $\frac{1}{16}$ inch.

12. A composition of matter according to claim 10 adapted to deliquefication and molding of boardlike and pressed massive structures, having average floc size of about ¼ to about ½ inch.

13. A composition of matter adapted as a slurry to the fabrication of papermaking furnish consisting essentially of
    (1) from about 98 to 80 percent by weight of aqueous vehicle and
    (2) about 2 to 20 percent by weight of suspended dispersed solids in combination having a dry weight basis composition according to claim 1 and predominantly negative electrical charge.

14. A composition of matter according to claim 13 sensitized to the flocculating action of a cationic flocculating agent by incorporation as a particulate non-fibrous material of at least one member of the group consisting of the zinc oxide and dispersed polyvalent-cation-exchanged montmorillonitic clay.

15. A composition of matter according to claim 13 wherein the aqueous vehicle is present in an amount of 90 to 96 percent and the solids are present in an amount of 10 to 4 percent.

16. The process for the production of a ceramic convertible water laid greensheet having a dry weight basis composition according to claim 4 which comprises the steps of (A) blending together, in 2 to 20 percent by weight suspension in water, 5% or more ground or macerated cellulosic fibers, inorganic fibers, non-fibrous mineral materials and elastomeric latex in that sequence, whereby a predominantly negatively charged suspension is obtained and (B) flocculating the said suspension by addition of a cationic flocculating agent whereby a pulp of cohesive flocs is obtained.

17. A composition of matter according to claim 6 wherein the inorganic content is selected to recrystallize on firing to at least one crystalline mineral species selected from the group consisting of zirconia, zircon, alumina, mullite, spinel, clinoenstatite, forsterite, cordierite and the diadochic equivalents of magnesium and aluminum therein.

18. A composition of matter according to claim 17 further including a mineralizer for the crystalline mineral species.

19. A composition of matter according to claim 7 having the inorganic content defined by the plane DEIH of FIGURE 2 when $M^4$ is zirconium and $M^3$ is aluminum.

References Cited

UNITED STATES PATENTS

| 2,563,502 | 8/1951 | Sweo | 106—48 |
| 2,373,914 | 4/1945 | Quinn | 162—145 |
| 3,041,190 | 6/1962 | Griffith et al. | 106—40 |
| 3,062,701 | 11/1962 | Novak | 162—155 |
| 3,102,063 | 8/1963 | Ray | 162—155 |
| 3,112,184 | 11/1963 | Hollenbach | 264—60 |
| 3,162,607 | 12/1964 | Burbidge et al. | 252—477 |
| 3,193,446 | 7/1965 | Eisenberg | 162—145 |

FOREIGN PATENTS 402,588   1931   Great Britain.

OTHER REFERENCES

Umphrey "Ceramic Honeycombs," Ceramic Industry, December 1959, pp. 78–79.

HELEN M. McCARTHY, Primary Examiner

U.S. Cl. X.R.

106—41, 57, 65; 162—145, 146, 155; 264—56, 116

PO-1050
(5/69)

UNITED STATES PATENT OFFICE
CERTIFICATE OF CORRECTION

Patent No. 3,458,329                     Dated  July 29, 1969

Inventor(s)    Kenneth E. Owens and Robert A. Hatch

It is certified that error appears in the above-identified patent and that said Letters Patent are hereby corrected as shown below:

Column 1, line 47, "includes" should read --included--. Column 4, line 4, "be" should read --the--. Column 5, line 17, "purposes" should read --purpose--; line 38, the word "readily" near end of line should appear before "recognized". Column 6, line 17, "pentalite" should read --petalite--. Column 11, line 11, "aperture" should read --aperturate--. Column 16, line 31, "fire" should read --fired--; line 38, "30" should read --300--. Column 18, line 27, "aluminum" should read --alumina--; line 27, "high" should read --higher--. Column 19, line 21, "curt" should read --curd--; lines 23 and 24, "curd-...tion" should read --flocs drain readily on a screen and permit the formation--; line 36, "slufate" should read --sulfate--. Column 20, line 49, "somswhat" should read --somewhat--. Column 22, line 17, "deliquified" should read --deliquefied--; line 52, "illusrates" should read --illustrates--; line 54, "hasing" should read --having--. Column 24, line 26, "hvaing" should read --having--.

SIGNED AND
SEALED
APR 28 1970

(SEAL)
Attest:

Edward M. Fletcher, Jr.
Attesting Officer

WILLIAM E. SCHUYLER, JR.
Commissioner of Patents